US006767625B2

(12) United States Patent
Adzima et al.

(10) Patent No.: US 6,767,625 B2
(45) Date of Patent: Jul. 27, 2004

(54) METHOD FOR MAKING A CHARGE OF MOLDABLE MATERIAL

(75) Inventors: Leonard J. Adzima, Pickerington, OH (US); Frederick H. Ponn, III, Newark, OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 15 days.

(21) Appl. No.: 10/331,327

(22) Filed: Dec. 30, 2002

(65) Prior Publication Data

US 2004/0126553 A1 Jul. 1, 2004

(51) Int. Cl.[7] .................................................. B32B 5/16

(52) U.S. Cl. ................. 428/323; 428/294.1; 428/300.1; 428/299.4; 427/208.2; 427/343; 427/358; 427/372.2; 427/375; 427/386

(58) Field of Search ........................... 428/294.1, 300.1, 428/299.4, 323, 343, 358, 372.2; 427/208.2, 375, 386

(56) References Cited

U.S. PATENT DOCUMENTS

| | | | | |
|---|---|---|---|---|
| 2,820,716 A | | 1/1958 | Harmon et al. | |
| 3,390,037 A | | 6/1968 | Christie | |
| 3,956,564 A | | 5/1976 | Hillig | |
| 4,211,818 A | | 7/1980 | Ackley | |
| 4,451,528 A | | 5/1984 | Krause | |
| 4,743,413 A | | 5/1988 | Galichon | |
| 4,770,915 A | | 9/1988 | Nakagawa et al. | |
| 4,859,533 A | | 8/1989 | Seiya et al. | |
| 5,085,928 A | | 2/1992 | Krueger | |
| 5,094,883 A | * | 3/1992 | Muzzy et al. | 427/185 |
| 5,116,668 A | | 5/1992 | Yamamoto et al. | |
| 5,171,630 A | * | 12/1992 | Muzzy et al. | 428/298.7 |
| 5,206,085 A | | 4/1993 | Nakagawa et al. | |
| 5,279,879 A | | 1/1994 | Takezawa et al. | |
| 5,326,630 A | | 7/1994 | Saito et al. | |
| 5,368,934 A | | 11/1994 | Torii et al. | |
| 5,725,954 A | | 3/1998 | Montsinger | |
| 5,727,357 A | | 3/1998 | Arumugasaamy et al. | |
| 5,756,206 A | | 5/1998 | Davies et al. | |
| 6,074,716 A | | 6/2000 | Tsotsis | |
| 6,139,956 A | | 10/2000 | Endoh et al. | |
| 6,258,453 B1 | | 7/2001 | Montsinger | |

* cited by examiner

*Primary Examiner*—Merrick Dixon
(74) *Attorney, Agent, or Firm*—Inger H. Eckert; Stephen W. Barns; Maria C. Gasaway

(57) ABSTRACT

A method for making moldable material comprises the initial step of providing a composite material comprised in part of an epoxy. A high performance strand is then distributed in the composite material to form a moldable material. Lastly, the moldable material is heated sufficiently to cause the composite material and the high performance strand to stick at least slightly together without melting the epoxy.

15 Claims, 2 Drawing Sheets

30
PROVIDING A COMPOSITE MATERIAL FORMED IN PART BY EPOXY

32
ADDING A HIGH-PERFORMANCE STRAND TO THE COMPOSITE MATERIAL TO FORM A MOLDABLE MATERIAL

34
HEATING THE MOLDABLE MATERIAL SUFFICIENTLY TO CAUSE THE COMPOSITE MATERIAL AND THE HIGH-PERFORMANCE STRAND TO STICK TOGETHER WITHOUT SUBSTANTIALLY MELTING THE EPOXY

METHOD FOR MAKING A CHARGE OF MOLDABLE MATERIAL

CROSS REFERENCE TO RELATED APPLICATION

This application is related to U.S. Provisional Patent Application No. 60/295,707 filed on Jun. 4, 2001 and U.S. patent application Ser. No. 09/935,267 filed on Aug. 22, 2001, which are incorporated herein by reference.

TECHNICAL FIELD

The present invention generally relates to moldable materials and, more particularly, relates to a method for making a moldable material. Most particularly, the invention relates to a method for efficiently making a cost-effective pliable moldable material having a high tensile strength and high modulus.

BACKGROUND OF THE INVENTION

It is well known to form a strand from a collection of fibers. This can be achieved, for example, by passing molten material (e.g., molten glass) through a plurality of orifices in a tip plate of a fiber forming bushing. Fibers formed by the fiber forming bushing are linearly pulled and gathered together to form one or more strands. The strands are typically wound on a collet to form packages, which subsequently can be used to produce various products. For example, a roving can be formed from a single strand (i.e., a single end roving) or a plurality of strands that are linearly pulled and gathered together (i.e., a multi-end roving). A plurality of rovings can be wound on a wrap wheel and then cut to form a hank, which can be used as a charge of material for making or molding a laminate or final composite part. A composite part formed from fibrous materials are preferred in applications where it is desirable to minimize the weight of the composite part.

A broad range of composite parts is produced from fibrous materials. Such composite parts differ in their requirement for tensile strength (i.e., how strong a material is when pulled upon) and modulus (i.e., how well a material resists deformation). Some composite parts require a high tensile strength and a high modulus. For example, lightweight composite leaf springs having a high tensile strength and a high modulus are preferred in high-performance motor vehicles. Conventionally, such leaf springs are molded from a charge of material formed from glass fiber strands impregnated with an epoxy resin. The glass fiber strands are impregnated by passing the glass fiber strands through a bath of epoxy resin. As a result of the impregnation, the charge of material has good wet out, (i.e., the glass fibers and epoxy resin are in close contact and the resin to glass ratio is appropriate, about 70% glass by weight and about 30% resin by weight). In a subsequent filament winding process, heat and pressure are used to cure and form the charge into a leaf spring. The filament winding process is well known in the art and works quite well but it does have its limitations. Often, the impregnated glass fiber strand is quite sticky and excess resin usually comes off the glass fiber strand and thus is wasted. In addition, the incorporation of other fibers with glass epoxy is very difficult because every type of fiber has its own unique set of processing characteristics.

What is needed is a lightweight, cost-effective charge of moldable material that is dry and easily processable and can very easily accept other fibers into the composite to modify and improve the composite part.

SUMMARY OF THE INVENTION

The present invention is directed toward a method for making moldable material comprising the initial step of providing a composite material comprised in part of an epoxy. A high performance strand is then distributed in the composite material to form a moldable material. Lastly, the moldable material is heated sufficiently to cause the composite material and the high performance strand to stick at least slightly together without melting the epoxy.

Various objects and advantages of this invention will become apparent to those skilled in the art from the following detailed description of the preferred embodiment, when read in light of the accompanying drawings.

DETAILED DESCRIPTION AND PREFERRED EMBODIMENTS OF THE INVENTION

Figure 1:
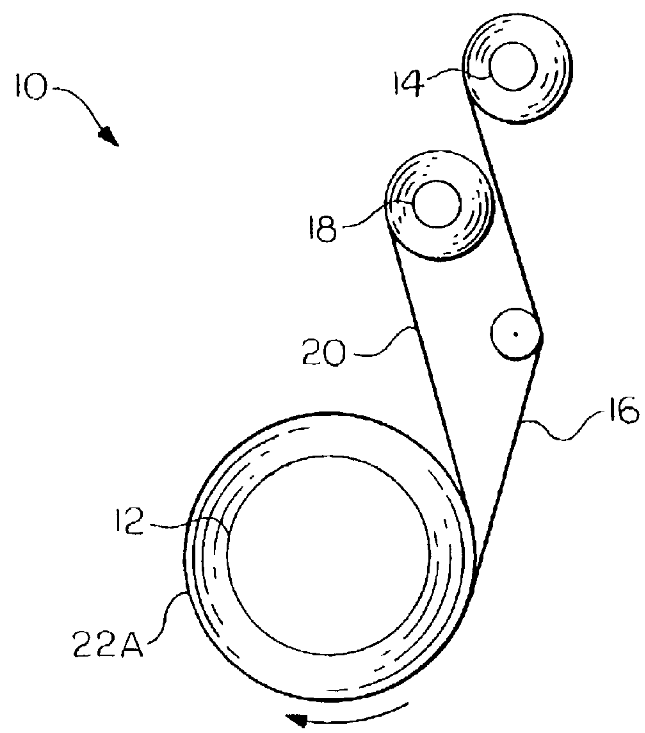
FIG. 1 is a diagrammatic representational view in elevation of an apparatus for forming a moldable material according to a preferred embodiment of the invention.
Figure 2:
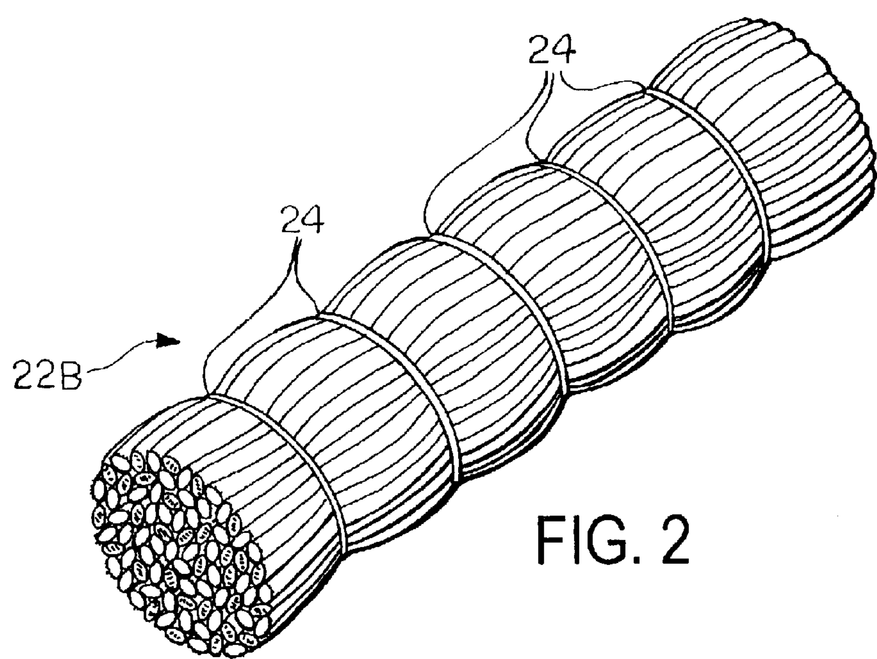
FIG. 2 is an enlarged perspective view of a moldable material formed by the apparatus illustrated in FIG. 1.

Now with reference to the drawing, there is illustrated in FIG. 1 an apparatus 10 for forming a moldable material. The apparatus 10 comprises a wrap wheel 12, a collet 14, from which a roving 16 is linearly pulled, and a collet 18, from which a high performance strand 20 is linearly pulled at the same time as the roving 16. The roving 16 and high performance strand 20 are "co-hanked" (i.e., wound together) on the wrap wheel 12 to form an uncut hank 22A. Once formed, the uncut hank 22A is removed from the wrap wheel 12, bound or tied together by cross-ties 24, and cut to form a hank 22B, as illustrated in FIG. 2. It is preferable to remove residual moisture from the hank 22B. This can be done in a desiccant oven (not shown) at a temperature of about 130° F. (54° C.) for several (e.g., six to eight) hours. This also slightly binds the roving 16 and the high performance strand 20 together. Once the roving 16 and the high performance strand 20 are slightly bound together, the cross-ties 24 can be removed and the hank 22B will keep its shape without the cross-ties 24.

The circumference of the wrap wheel 12 and the diameter or thickness of the roving 16 and high performance strand 20 wound about the wrap wheel 12 vary depending on the composite part being formed. For example, a wrap 10 wheel that is about 36 inches (90 cm) in circumference will produce a hank 22B that is about 36 inches (90 cm) long. To form a 0.125 (3 mm) thick composite part having a width of 3 inches and a length of 36 inches, the roving 16 and high performance strand 20 can be wound about the wrap wheel 12 to form about a 1.5–2 inch (4–5 cm) diameter or thick hank 22B. The cross-ties 24 should be spaced sufficiently apart to bind the hank 22B together. In a preferred embodiment of the invention, the cross-ties 24 are spaced about every 4–6 inches (10–15 cm) apart.

Figure 3:
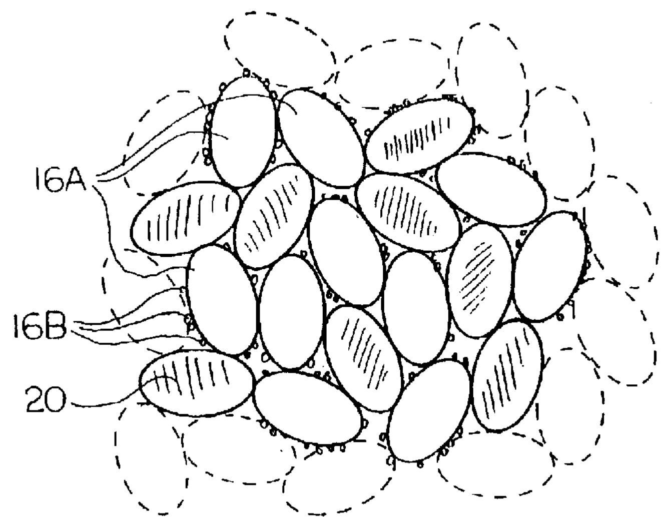
FIG. 3 is an enlarged schematic representational view in cross-section of a portion of the moldable material illustrated in FIG. 2.

The roving 16 is in the form of a composite material. According to a preferred embodiment of the invention, the composite material comprises one or more fibrous glass strands 16A (e.g., E-glass-strands) having a matrix of epoxy powder 16B applied thereto. In a preferred embodiment of the invention, the epoxy powder 16B is applied to the outside of the fibrous glass strands 16A, as illustrated in FIG. 3, and does not substantially impregnate the fibrous glass strands 16A. The composite material preferably includes strands 16A that are about 60–80% by weight glass and about 20–40% by weight epoxy, depending on the composition of the high performance strand being added. The high performance strand 20 has a certain number of individual filaments. There should not be too many filaments or the high performance strand 20 will not properly wet out (i.e., flow of the epoxy powder 16B to the roving 16 and the high performance strand 20). The fibrous glass strands 16A are not sticky. However, there should be a sufficient amount of epoxy powder 16B (e.g., about 20–40% epoxy powder 16B by weight) to permit the epoxy powder 16B to be shared with the high performance strand 20 when the roving 16 and the high performance strand 20 are consolidated. The amount of epoxy powder 16B by weight can be mathematically calculated. The epoxy powder 16B may be applied by passing the fibrous glass strands 16A through a slurry or bath (not shown) of water and the epoxy powder 16B. Excess water and epoxy powder 1 6B is removed from the fibrous glass strands 16A by subsequently passing the fibrous glass strands 16A through a stripper die (not shown), which is well known in the art. The water is removed from the fibrous glass strands 16A in a desiccant oven (not shown) that is heated at a temperature sufficient to remove the water but not substantially melt the epoxy powder 16B. The resultant fibrous glass strands 16A are dry (i.e., not sticky) and easily processable.

The high performance strand 20 is preferably a carbon fiber strand. However, other fiber strands (e.g., an Aramid fiber strand, which are manufactured by DuPont, a company located in Wilmington, Del., U.S.A., or an S-2 glass fiber strand) may be suitable for carrying out the invention. The high performance strand 20 has a higher tensile strength and a higher modulus than the fibrous glass strand or strands 16A from which the roving 16 is formed. However, the high performance strand 20 is more expensive than the fibrous glass strands 16A from which the roving 16 is formed. For this reason, the high performance strand 20 is distributed in the roving 16. This is accomplished by winding the roving 16 and the high performance strand 20 together on the wrap wheel 12. In a preferred embodiment of the invention, the high performance strand 20 is randomly distributed in the roving 16, as illustrated in FIG. 3. The random distribution of the high performance strand 20 in the roving 16 insures that the epoxy powder 16B, when heated beyond its melting point, flows and comes into contact with the entire high performance strand 20 during consolidation of the roving 16 and the high performance strand 20. A desired ratio of composition of the roving 16, the high performance strand 20, and the epoxy powder 16B can be easily calculated. These ratios may vary depending on the composite part being formed. For example, a hank having about 39% glass, about 42% carbon, and about 19% epoxy by weight forms an acceptable composite part in a leaf spring application.

The roving 16 and the high performance strand 20 are bound together (to form the hank 22B) with the epoxy powder 16B by heating the epoxy powder 16B to a temperature that causes the epoxy powder 16B to become adhesive. The adhesive property causes the roving 16 and the high performance strand 20 to slightly fuse together. However, the epoxy powder 16B is not heated to a temperature that causes the epoxy powder 16B to melt, as is the case in final forming when the epoxy fully wets out the fibers. As stated above, the hank 22B is heated to a temperature of about 130° F. (54° C.) for several (e.g., six-to eight) hours. Air circulates in the desiccant oven in which the hank 22B is dried to aid in uniformly drying the epoxy powder 16B. Once dried, the hank 22B is sufficiently adherent to be self supporting after the cross-ties 24 are removed.

The hank 22B is adapted for use in forming a composite part. This can be accomplished by placing the hank 22B in a pressurized or compression mold (not shown). The mold, which can include a male part and a female part, is heated at a temperature above the melting point of the epoxy powder 16B. The melted epoxy powder 16B wets the roving 16 and high performance strand 20. As a result, the roving 16 and high performance strand 20 are completely wet out to convert the hank 22B into a unidirectional hybrid (i.e., glass roving 16 and high performance strand 20) laminate or composite part having a matrix of epoxy material throughout. In a preferred embodiment of the invention, the epoxy material 16B is of the type that cures at about 375–400° F. (190–205° C.). This temperature is lower than the melting point, which exceeds 1,200° F. (650° C.), of the fibrous glass strand or strands 16A from which the roving 16 is formed and high performance strand 20. The hank 22B can be formed into a composite part, for example, by heating the hank 22B for about one hour while the hank 22B is compressed with a force of about 1,000 PSI (6895 kPa). The roving 16, the high performance strand 20, and the epoxy powder 16B are mixed and cured during the molding process.

In an experimental test, a spool of a single end roving 16 comprised of a fibrous glass strand 16A having an epoxy powder 16B applied thereto was provided. The fibrous glass strand 16A was formed from about 800 glass filaments. Each filament was about 12 microns in diameter. The amount of epoxy powder 16B on the fibrous glass strand 16A was about 33% by weight. Hence, the fibrous glass strand 16A, from which the roving 16 was made, was comprised of about 67% glass by weight and about 33% epoxy powder 16B by weight. The glass-epoxy strands were molded to make a control part about 28 inches (71 cm) long, about 3 inches (7.6 cm) wide, and about ⅛ inch (3 mm) thick.

In comparison, another spool of single end roving 16 comprised of a fibrous glass strand 16A having an epoxy powder 16B applied thereto was provided. Two of these rovings 16 were co-hanked with one high performance strand 20 of carbon fiber strand comprised of 6,000 fibers. The ratio of composition was as follows: about 39% glass by weight, about 42% carbon by weight and about 19% epoxy by weight. The resultant hank 22B was then molded to make a composite part with the same dimensions as above.

The mechanical properties of both the glass and epoxy (without a carbon fiber strand) and glass and epoxy (with a carbon fiber strand) composite parts were then measured and the results are shown in Table 1.

TABLE 1

| Material | Tensile (ksi) | Tensile Modulus ($10^6$ psi) | Flex (ksi) | Flex Modulus ($10^6$ psi) | Notched Izod (ft-lb/in) |
|---|---|---|---|---|---|
| 67% glass and 33% epoxy | 110 | 5.8 | 141 | 5.9 | 73 |
| 39% glass, 42% carbon, and 19% epoxy powder | 152 | 17.4 | 139 | 12.3 | 54 |

Figure 4:
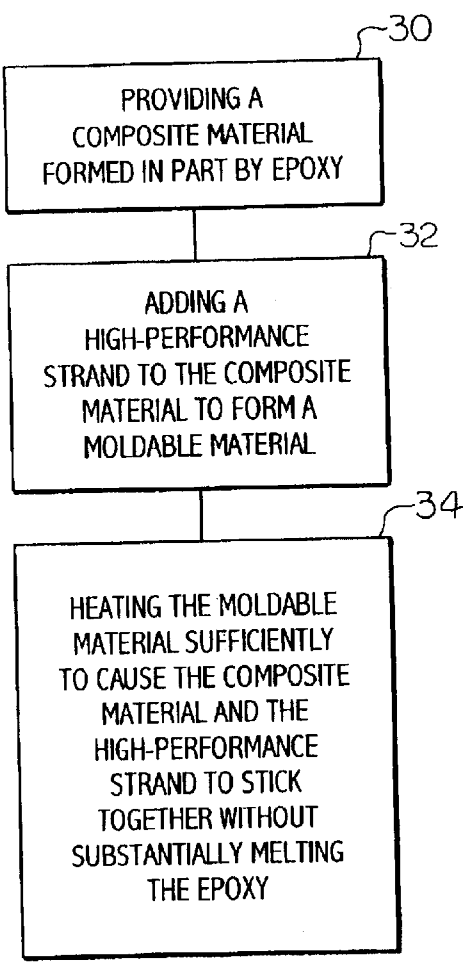
FIG. 4 is a flow diagram of a method for forming a moldable material according to a preferred embodiment of the invention.

A method for forming a moldable material (i.e., a hank) according to a preferred embodiment of the invention is illustrated in FIG. 4. The method comprises the initial step 30 of providing a composite material. The composite material is preferably in the form of a roving. The roving may be formed from a single end roving (i.e., formed from a single strand) or a multi-end roving (i.e., formed from a plurality of fibrous glass strands). The fibrous glass strand or strands are subsequently dipped in an aqueous-based slurry of epoxy powder. Moisture is removed from the slurry so that only epoxy powder remains on the fibrous glass strands. This can be accomplished by passing the fibrous glass strands through a desiccant oven at a speed and temperature that removes the moisture without melting the epoxy powder. Next, a high performance strand is distributed in the composite material, as illustrated in step 32. This can be accomplished by winding the composite material and the high performance strand on a wrap wheel to form an uncut moldable material. According to a preferred embodiment of the invention, the high performance strand is randomly distributed in the composite material so as to insure that a good wet out (i.e., epoxy flows to both the roving and the high performance strand) occurs when a composite part is being formed. The uncut moldable material is cut to form a moldable material. The moldable material can be held together with cross-ties. Finally, the moldable material is heated sufficiently to cause the composite material and the high performance strand to stick at least slightly together without melting the epoxy powder, as illustrated in step 34. By using a roving formed from glass fibrous strands having a powdered epoxy applied thereto, the high performance fiber does not have to be dipped in a liquid epoxy resin. It is simply placed in close physical contact with the fibrous glass strands having the dry epoxy powder applied thereto, then under pressure and heat the epoxy powder melts and wets both the glass and carbon fibers which produces a hybrid composite article.

The hank 22B according to the invention is lightweight and cost-effective. The hank 22B is not too sticky. Moreover, the hank 22B is substantially flat and thus, more pliable or bendable, at least in one direction, yet has a desired stiffness.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for forming a moldable material comprising the steps of:

a) providing a composite material comprised in part of an epoxy;

b) distributing a high performance strand in the composite material to form a moldable material; and c) heating the moldable material sufficiently to cause the composite material and the high performance strand to stick at least slightly together without melting the epoxy.

2. The method according to claim 1, wherein the epoxy is in the form of an epoxy powder and the composite material is in the form of a roving formed from one or more fibrous glass strands dipped in an aqueous-based slurry having the epoxy powder therein.

3. The method according to claim 2, wherein moisture is removed from the slurry so that only epoxy powder remains on the one or more fibrous glass strands.

4. The method according to claim 3, wherein the moisture is removed from the slurry by passing the one or more fibrous glass strands through a desiccant oven at a speed and temperature that removes the moisture without melting the epoxy powder.

5. The method according to claim 1, wherein the high performance strand is distributed in the composite material by winding the composite material and the high performance strand on a wrap wheel.

6. The method according to claim 5, wherein the high performance strand is randomly distributed in the composite material so as to insure that the epoxy flows to the high performance strand when the epoxy is heated above a melting point of the epoxy.

7. The method according to claim 6, wherein the composite material and the high performance strand distributed therein are cut to form a moldable material.

8. The method according to claim 7, wherein the moldable material is held together with cross-ties until heated sufficiently to cause the composite material and the high performance strand to stick at least slightly together.

9. A molded composite part comprising:

a) a plurality of high performance strands;

b) a plurality of composite strands; and c) an epoxy;

wherein said high performance strands and said composite strands are generally parallel and randomly mixed throughout the composite part.

10. The composite part of claim 9, wherein said composite material is a glass strand.

11. The composite part of claim 9, wherein said high performance strand is selected from the group consisting of carbon fibers, Aramid fibers and S-2 glass fiber strand.

12. The composite part of claim 9, wherein said epoxy is a powder epoxy.

13. The composite part of claim 9, wherein said composite part has a tensile strength of 152 ksi and a tensile modulus of $17.4\times10^6$ psi.

14. The part of claim 9, wherein said composite part has a flex strength of 139 ksi and a flex modulus of $12.3\times10^6$ psi.

15. The part of claim 9, wherein said composite part has a notched izod impact strength of 54 ft./lb./in.

* * * * *